United States Patent [19]
Seo

[11] Patent Number: 6,033,132
[45] Date of Patent: Mar. 7, 2000

[54] IRIS APPARATUS

[75] Inventor: Shuzo Seo, Saitama, Japan

[73] Assignee: Asahi Kogaku Kogyo Kabushiki Kaisha, Tokyo, Japan

[21] Appl. No.: 09/208,773

[22] Filed: Dec. 10, 1998

[30] Foreign Application Priority Data

Dec. 15, 1997 [JP] Japan .................................. 9-344601

[51] Int. Cl.⁷ .............................. G03B 9/00; G02B 26/02
[52] U.S. Cl. ........................ 396/452; 396/458; 396/505; 348/362; 359/228
[58] Field of Search ................................... 396/452, 458, 396/505; 348/362; 359/228, 886

[56] References Cited

U.S. PATENT DOCUMENTS

| | | |
|---|---|---|
| 3,336,852 | 8/1967 | Levin ........................................ 396/458 |
| 3,756,700 | 9/1973 | Saxe ......................................... 359/228 |
| 5,589,906 | 12/1996 | Shimizu ................................... 396/505 |
| 5,781,343 | 7/1998 | Cook ................................... 359/228 X |

*Primary Examiner*—W. B. Perkey
*Attorney, Agent, or Firm*—Kane, Dalsimer, Sullivan and Levy, LLP

[57] ABSTRACT

An iris apparatus includes a transparent elastic member which is provided on an optical axis including a convex surface, the apex thereof being located on the optical axis; a transparent plate which is opposed to the convex surface of the transparent elastic member in the optical axis direction; an elastic tube which defines a space between the convex surface of the transparent elastic member and the transparent plate; light intercepting liquid which is contained within the space; and an actuator that relatively moves the transparent elastic member and the transparent plate in the optical axis direction.

19 Claims, 4 Drawing Sheets

IRIS APPARATUS

BACKGROUND OF THE INVENTION

1. Field of the Invention

The present invention relates to an iris apparatus (diaphragm apparatus) which can be advantageously used for a diaphragm or a shutter of a camera.

2. Description of the Related Art

In a conventional diaphragm apparatus of a camera, a plurality of shutter blades are circumferentially arranged and held between stationary and movable circular rings; wherein the amount of overlapping of the shutter blades is varied to thereby vary the diameter of a central aperture defined by the shutter blades when the movable ring is rotated in the circumferential direction. To this end, the number of the components, including: the shutter blades, the stationary and movable rings, and a mechanism which moves the diaphragm, is increased; and consequently, it is difficult to make the diaphragm apparatus small. In particular, in recent digital cameras using CCD image pickup devices, it is necessary not only to miniaturize the camera body, but also the photographing lens system in order to correspond with the extremely small CCD image pickup device. Accordingly, it is necessary for the diaphragm apparatus and the shutter device to be made smaller. Furthermore, the speed of the movement of a mechanical operation is limited. For example, in the case of a diaphragm shutter in which the diaphragm is used also for a shutter, it is difficult to carry out a photographing operation at high speed. In addition, in the conventional diaphragm apparatus, since the aperture is defined by shutter blades, the aperture is of a polygonal shape determined in accordance with the number of the shutter blades; and hence blur-spot of an object image picked up by the camera is polygonal, thus resulting in deteriorated image quality.

As mentioned above, in the conventional diaphragm apparatus, from the mechanical viewpoint, the number of the elements is increased, making it difficult to make the diaphragm apparatus small, and difficult to increase the speed of the mechanical operation. Moreover, from the viewpoint of the photographing operation, an image in an out-of-focus state is polygonal, whereby a high quality image cannot be obtained. In addition to, if the diaphragm apparatus is driven by a power source such as a battery, the power consumption is increased due to the large mechanical load necessary to simultaneously move the plural shutter blades, thus leading to a reduced service life of the battery. The problem with the increased power consumption is especially serious, taking into account the miniaturization of the camera in which the battery capacity is reduced.

SUMMARY OF THE INVENTION

It is an object of the present invention to provide a small and high speed iris apparatus without using shutter blades, in which the power consumption can be reduced and can be used as a diaphragm device or a shutter device.

To achieve the object mentioned above, according to an aspect of the present invention, there is provided an iris apparatus including: a transparent elastic member which is provided on an optical axis including a convex surface, the apex thereof being located on the optical axis; a transparent plate which is opposed to the convex surface of the transparent elastic member in the optical axis direction; an elastic tube which defines a space between the convex surface of the transparent elastic member and the transparent plate; light intercepting liquid which is contained within the space; and an actuator that relatively moves the transparent elastic member and the transparent plate in the optical axis direction.

Preferably the transparent elastic member is in the form of a cylinder, the axis thereof being identical to the optical axis.

Preferably, the convex surface being defined by a surface which is rotationally symmetrical, the rotation axis thereof being identical to the optical axis.

Preferably, the rotationally symmetrical surface comprises a spherical surface.

Preferably, the transparent plate is movable relative to the transparent elastic member in the direction of the optical axis.

Preferably, the light intercepting liquid includes a colloidal solution which contains therein particles which do not permit light to pass therethrough.

Preferably, the actuator includes a piezoelectric device.

According to another aspect of the present invention, there is provided an iris apparatus including: a pair of flat transparent plates opposed to each other with respect to an optical axis and are each provided perpendicular to the optical axis; a piezoelectric device provided between the transparent plates at the peripheral portions thereof; a transparent elastic member which is attached to an inner surface of one of the transparent plates and which is provided, on the surface thereof opposed to the other transparent plate, with a convex surface whose apex is located on the optical axis; an elastic tube which seals and partly surrounds the transparent elastic member in a space between the transparent plates; light intercepting liquid which is contained inside a space defined by the elastic tube; and a controller that adjusts the distance between the transparent plates by controlling a voltage to be applied to the piezoelectric device, wherein the amount of deformation of the convex surface of the transparent elastic member by the contact of the other transparent plate is determined by the amount of voltage applied to the piezoelectric device; wherein a portion of the light intercepting liquid within the space can escape from the apex area of the transparent elastic member to a peripheral area of the transparent elastic member upon the deformation of the piezoelectric device.

Preferably, the transparent plates are each made of a circular flat glass plate and wherein the transparent elastic member is in the form of a cylinder, the axis thereof being identical to the optical axis; the convex surface being defined by a spherical surface, the center thereof being located on the optical axis.

Preferably, one of the pair of flat transparent plates is movable relative to the other flat transparent plate in the direction of the optical axis.

Preferably, the light intercepting liquid includes a colloidal solution which contains therein particles which do not permit light to pass therethrough.

Preferably, an area defined by the contact of the other transparent plate with the convex surface of the transparent elastic member is a circle.

According to further aspect of the present invention, there is provided an iris apparatus including: a transparent elastic member which is provided with a convex surface, the apex thereof being located on an optical axis; the convex surface being rotationally symmetrical, and the rotation axis thereof being identical to the optical axis; a transparent plate which is opposed to the convex surface of the transparent elastic member in the optical axis direction; an elastic container which defines a space between the convex surface of the transparent elastic member and the transparent plate, the elastic container containing light intercepting liquid in the space; and an actuator that relatively moves the transparent elastic member and the transparent plate in the optical axis direction, wherein the contact area of the convex surface of the transparent elastic member and the transparent plate is varied; wherein a portion of said light intercepting liquid within said space can escape from the apex area of said transparent elastic member to a peripheral area of said transparent elastic member upon the deformation of said actuator.

Preferably, the contact area is a circle.

Preferably, the rotationally symmetrical surface includes a spherical surface.

Preferably, the transparent plate is movable relative to the transparent elastic member in the direction of the optical axis.

Preferably, the light intercepting liquid includes a colloidal solution which includes particles which do not permit light to pass therethrough.

Preferably, the actuator is a piezoelectric device.

A return-spring for returning the transparent plate back to an initial position upon the actuator being released can also be utilized.

In the above described structures, when the transparent plates are spaced from one another at a relatively large distance, the light intercepting liquid exists between the other transparent plate and the transparent elastic member, wherein no light can be transmitted therethrough.

If a piezoelectric device is utilized for the actuator, if the distance between the transparent plates is reduced by varying the voltage applied to the piezoelectric device, the other transparent plate becomes in close contact with the spherical surface of the transparent elastic member and is pressed thereagainst to elastically deform the same. If a different type of actuator is utilized, the same result is achieved.

Consequently, the light intercepting liquid with which the space between the transparent plate and the spherical surface has been filled is removed, wherein the close contact area defines a diaphragm aperture which permits the light to pass therethrough.

The present disclosure relates to subject matter contained in Japanese Patent Application No. 09-344601 (filed on Dec. 15, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
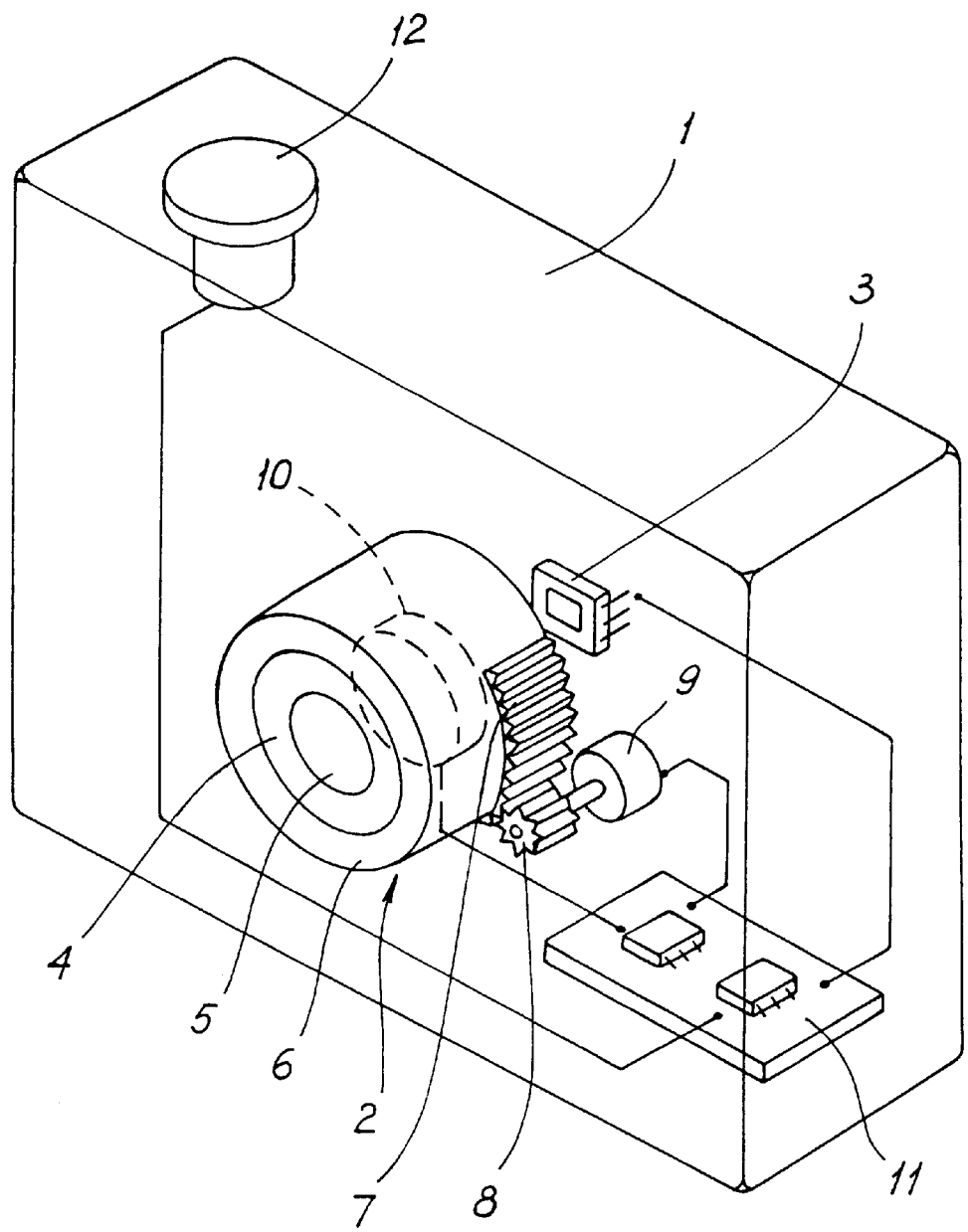
FIG. 1 is a schematic perspective view of an embodiment of an iris apparatus applied to a digital still camera, according to the present invention.

FIG. 1 shows a perspective view of a thin digital still camera to which the present invention is applied. A photographing lens 2 is provided substantially at the center portion of a camera body 1. A CCD image pickup device 3 is provided behind on the optical axis of the photographing lens 2. An object image formed by the photographing lens 2 is converted to an electric signal which is output as an image signal. The photographing lens 2 is provided with an optical lens 5 which is arranged in an inner lens barrel 4 which is in turn connected to an outer lens barrel 6, coaxial to the inner lens barrel 4 via helicoids. The outer barrel 6 is provided on its outer peripheral surface with a partial (sector) gear 7 which is in mesh with a small gear 8 mounted to a drive shaft of a stepping motor 9. The photographing lens 2 is provided on the optical axis of the optical lens 5 with an iris apparatus 10 as a diaphragm/shutter device to control the quantity of light transmitted through the photographing lens 2, and made incident upon the CCD image pickup device 3. An iris control operation is, for example, initially performed in order to perform an operation such as photometering. The iris apparatus 10 also functions as a shutter which is closed upon photographing. The CCD image pickup device 3, the stepping motor 9, and the iris apparatus 10 are connected to a control circuit 11 which carries out automatic exposure control and automatic focusing operations. A release button 12 provided in the camera body 1 is also connected to the control circuit 11.

In the digital still camera of the present invention, when the release button 12 is actuated, the control circuit 11 drives the stepping motor 9 to thereby rotate the small gear 8 in accordance with the image signal of the object image picked up by the CCD image pickup device 3. Subsequently, the sector gear 7 which is in mesh with the small gear 8 is rotated to thereby rotate the outer barrel 6 integral with the sector gear 7. Thus, the inner barrel 4 is moved in the optical axis direction through the helicoid mechanism between the outer and inner barrels (6 and 4 respectively) to carry out an automatic focusing operation. The control circuit 11 performs the exposure calculation in accordance with the image signal to control the diaphragm of the iris device 10. Moreover, upon closing the aperture of the iris device 10, the image signal of the object image is supplied to the control circuit 11 from the CCD image pickup device 3 immediately before the closure of the aperture to perform the image pickup operation.

Figure 2:
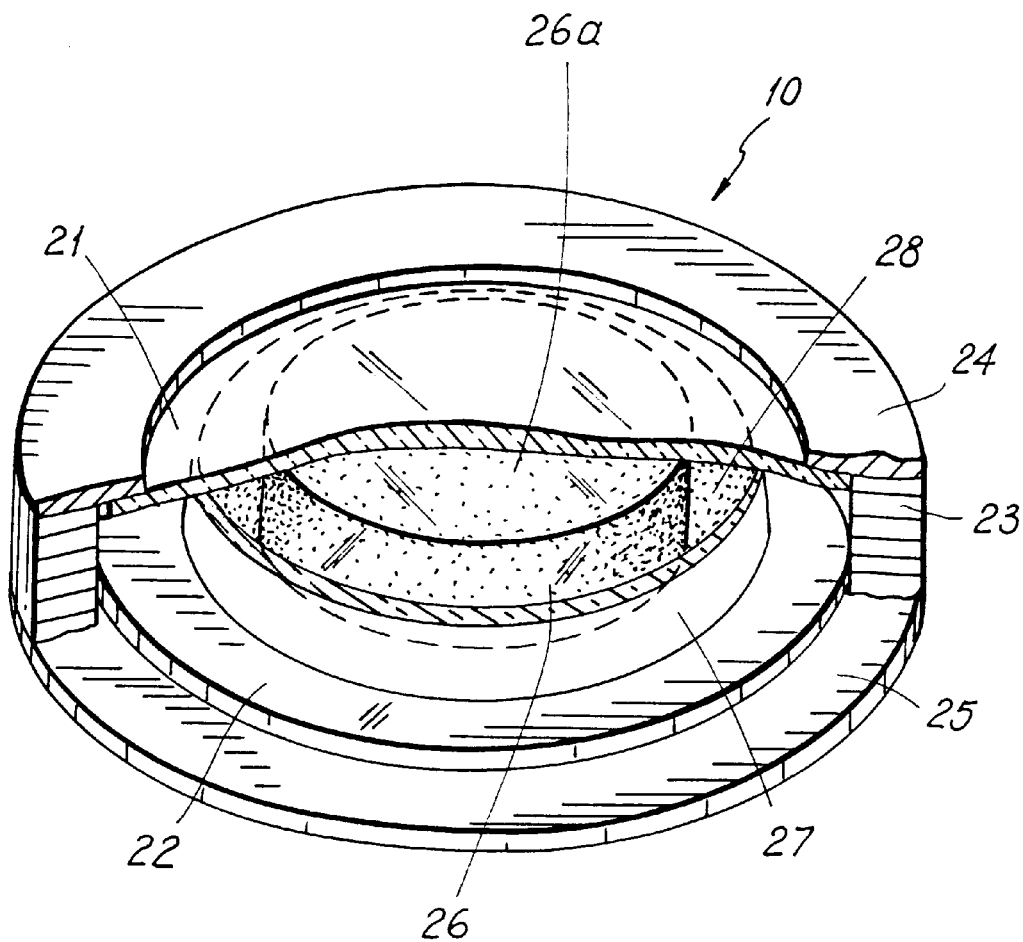
FIG. 2 is a cut-away perspective view of an iris apparatus according to the present invention.
Figure 3A:
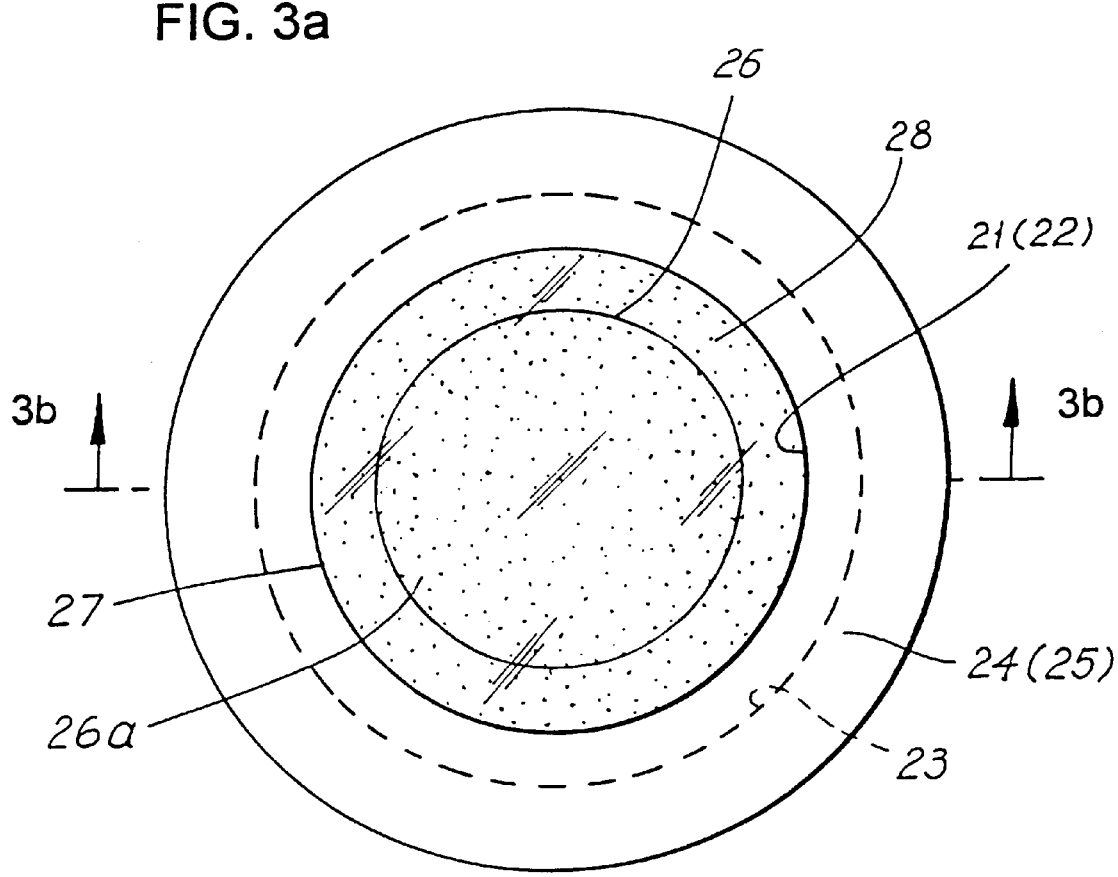
FIGS. 3a and 3b are a main elevational view of an iris apparatus in a closed position (viewed from the optical axis direction) and a sectional view taken along the line A—A in FIG. 3a, respectively.
Figure 3B:
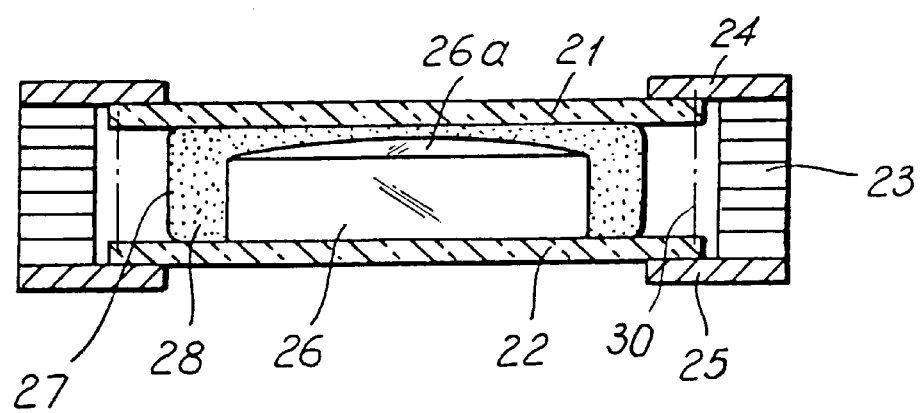

The iris apparatus 10 is shown in FIGS. 2, 3a and 3b. The iris device 10 includes front and rear flat glass plates 21 and 22 in the form of transparent circular discs. The glass plates 21 and 22 are spaced at a predetermined distance from one another in the optical axis direction of the photographing lens 2 and are held integrally at the peripheral edges thereof by an annular piezoelectric device (constituting piezoelectric elements) 23. The piezoelectric device 23 changes in size in the direction of the thickness thereof when voltage is applied thereto. The piezoelectric device 23 is composed of a plurality of annular circular piezoelectric layers which are superimposed in the optical axis direction of the photographing lens 2 so as to provide the above-mentioned predetermined distance between the front and rear glass plates 21 and 22. To protect the peripheral edges of the piezoelectric device 23 and the glass plates 21 and 22, annular circular protection plates 24 and 25 are provided on the front and rear surfaces of the piezoelectric device 23 and the glass plates 21 and 22.

A transparent elastic member 26 in the form of a short circular cylinder is provided at the center of the iris device 10 and between the flat glass plates 21 and 22. The elastic member 26 is secured at its bottom surface to the inner surface of the rear glass plate 22. The elastic member 26 has a spherical front surface 26a opposed to the front glass plate 21, wherein the center portion of the spherical surface 26a is located on the optical axis and has a convex shape toward the front glass plate 21. The elastic member 26 is made of a transparent material which permits light to pass therethrough, such as transparent silicone resin.

An elastic tube (container) 27 made of a thin elastic film is provided in a space between the front and rear glass plates 21 and 22 to surround the transparent elastic member 26. The outer diameter of the elastic tube 27 is substantially identical to the inner diameter of the protection plates 24 and 25. The elastic tube 27 is in close contact, at the opposite ends thereof, with the inner surfaces of the glass plates 21 and 22. The space defined by the inside of the elastic tube 27 (which occupies a space between the glass plates 21 and 22) is filled with a light intercepting liquid 28 which includes liquid with light intercepting or light transmission reducing properties, or sol particles. The light intercepting liquid 28 includes a colloidal solution, e.g. Fe colloidal solution, which contains therein metal particles which do not permit light to pass therethrough in a suspended state.

In the iris apparatus 10 constructed as above, when electricity is not supplied to the piezoelectric device 23, the elements 23 have a maximum thickness in the optical axis direction so as to provide a space between the front glass plate 21 and the rear glass pate 22 at a predetermined distance, as shown in FIG. 3b. One of the annular circular protection plates 24 or 25, is fixed to a lens frame wherein the distance between the annular circular protection plates (24 and 25), i.e., the distance between the opposing glass plates (22 and 21), changes according to the piezoelectric device. The front glass plate 21 is spaced from the front surface 26a of the transparent elastic member 26. Namely, there is a gap between the front glass plate 21 and the front surface 26a of the transparent elastic member 26, wherein the space defined by the gap is filled with light intercepting liquid 28. Thus, no light passes through the portion of the light transmission surface of the front glass plate 21 that is surrounded by the elastic tube 27. Therefore, the iris apparatus 10 does not permit light to pass therethrough, as shown in FIG. 3a, in which the diaphragm/shutter is closed. As can be clearly seen in FIG. 3b, light intercepting liquid 28 is also present around the periphery of the transparent elastic member 26, which includes a portion of light intercepting liquid 28 that escapes from the frontal (apex) area of the transparent elastic member 26 (and vice-versa) upon the deformation of the piezoelectric device. The presence of the light interception liquid 28 also prevents possible stray light rays in the peripheral area of the aperture.

Figure 4A:
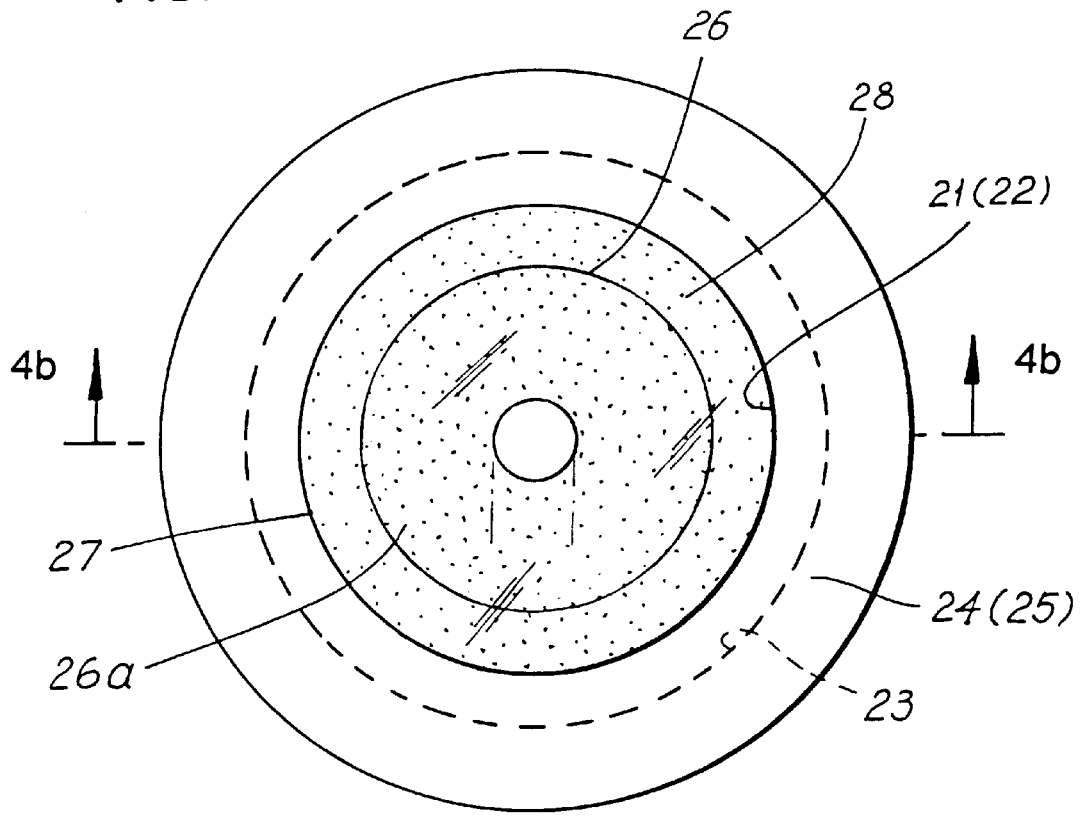
FIGS. 4a and 4b are a main elevational view of an iris apparatus in an open position (viewed from the optical axis direction) and a sectional view taken along the line A—A in FIG. 4a, respectively.
Figure 4B:
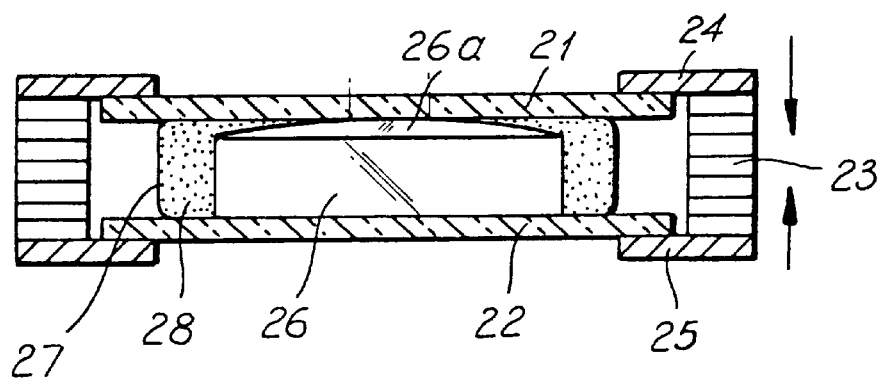

If the piezoelectric device 23 is supplied with electricity, deformation of the piezoelectric device 23 occurs whereby the thickness thereof in the optical axis direction is reduced, as shown in FIG. 4b. Consequently, the distance between the glass plates 21 and 22 is reduced, the front glass plate 21 is pressed against the front surface 26a of the transparent elastic member 26 and deforms the member 26 in the optical axis direction. Since the front surface 26a of the elastic member 26, which is in press contact with the front glass plate 21, is made of a spherical surface whose center is located on the optical axis, the contact portion I of the front glass plate 21 and the front surface 26a of the elastic member 26 is of a circular shape, as shown in FIG. 4a. As a result, the light can pass through the circular portion I due to the absence of the light intercepting liquid 28 therein.

Namely, the circular portion I defines the aperture to control the quantity of light in the photographing lens 2. Since the deformation of the piezoelectric device 23 in the optical axis direction is determined in accordance with the voltage applied thereto, the deformation of the front surface 26a of the elastic member 26 caused by the front glass plate 21 can be varied in accordance with the control of the voltage applied to thereby vary the diameter of the circular contact portion (aperture), through which light can pass and which is formed by press contact between the front surface 26a of the transparent elastic member 26 and the front glass plate 21. Thus, the aperture diameter can be set to a desired setting by controlling the voltage applied to the piezoelectric device 23.

As can be understood from the foregoing, in the iris apparatus 10, a desired diameter of aperture can be obtained by controlling the voltage applied to the piezoelectric device 23. In the illustrated embodiment, it is also possible to completely close the diaphragm by stopping the supply of voltage to the piezoelectric device 23; in other words, the iris apparatus 10 can also be used as a shutter device. Since only the reduction of the thickness of the piezoelectric device 23 in the optical axis direction, followed by the movement of the glass plate 21 in the thickness direction thereof takes place upon control of the aperture diameter by the iris apparatus 10, no mechanical operation is needed to move the shutter blades as in the prior art. Consequently, not only can a high-speed operation be provided, but also power consumption can be reduced. Moreover, since the front surface 26a of the elastic member 26 is spherical, wherein the contact portion thereof with the front glass plate 21 is a circle, the aperture is a circle, the diameter of the aperture can be easily adjusted, and the blur-spot of the object image is also a circle, thus resulting in a high image quality.

Although the piezoelectric device 23 is used to move the front glass plate 21 in the thickness direction thereof in the illustrated embodiment, it is possible to use a solenoid or other actuators instead. Also, it is possible to provide a return-spring 30 shown in FIG. 3B by a phantom line or the like which automatically and compulsively returns the glass plate to the initial position when the application of the voltage is stopped. However, it is preferable that no mechanical operating portion be provided, in order to increase the speed of the diaphragm operation and reduce the power consumption. In addition, although the outer shape of the iris apparatus is circular in the illustrated embodiment, it is possible to use rectangular glass plates. The front surface of the elastic member 26 is not limited to a spherical shape, and can be a curved surface such as a rotational parabolic surface, the rotational axis being located on the optical axis; or a polygonal pyramid shape whose center axis coincides with the optical axis. In order to form a circular aperture to obtain a circular blur-spot object image, the front surface of the elastic member must have a rotational symmetry wherein the axis coincides with the optical axis. It is also possible to use a flat transparent resin plate in place of the flat glass plate.

Although the iris apparatus is used for a diaphragm/shutter device of a digital still camera in the illustrated embodiment, the present invention can be used for a diaphragm or shutter device of a camera using a photosensitive film. For example, the iris apparatus can be applied to a diaphragm or shutter device of a compact camera or a single lens reflex camera. In such an application, it is preferable that the voltage be applied to the piezoelectric device in accordance with the shutter release operation. To this end, the piezoelectric device must be constructed wherein the transparent plate is moved close to the transparent elastic member when the voltage is applied thereto as in the embodiment illustrated above. In general, a piezoelectric device exhibits physical properties wherein the piezoelectric device is deformed or extended in a direction perpendicular to the first direction when it is deformed or contracted in one direction in accordance with the application of the voltage thereto. Therefore, if the piezoelectric device has a multi-layered structure like that of the illustrated embodiment, the transparent plate is moved toward the transparent elastic member, upon releasing in a photosensitive film camera, to set a predetermined diameter of diaphragm aperture and to carry out the shutter operation.

As can be seen from the above discussion, according to the present invention, the contact area of the surface portion of the transparent elastic member with the transparent plate is varied by varying the distance therebetween, wherein the contact area defines a diaphragm aperture. Consequently, the diaphragm aperture can be controlled only by the movement of the transparent plate in the optical axis direction without the need for a mechanical operation to move the shutter blades as in the prior art. Thus, not only can a fast operation be carried out, power consumption can also be reduced. Moreover, in the case that the transparent elastic member has a spherical front surface which can be brought into close-contact with the transparent plate so as to define a circular contact area, the diaphragm aperture thus obtained is circular and the blur-spot object image is also circular, thus resulting in an enhanced image quality.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An iris apparatus comprising:
   a transparent elastic member which is provided on an optical axis comprising a convex surface, the apex thereof being located on said optical axis;
   a transparent plate which is opposed to said convex surface of said transparent elastic member in said optical axis direction;
   an elastic tube which defines a space between said convex surface of said transparent elastic member and said transparent plate;
   light intercepting liquid which is contained within said space; and
   an actuator that relatively moves said transparent elastic member and said transparent plate in said optical axis direction.

2. An iris apparatus according to claim 1, wherein said transparent elastic member is in the form of a cylinder, the axis thereof being identical to said optical axis.

3. An iris apparatus according to claim 1, wherein said convex surface being defined by a surface which is rotationally symmetrical, the rotation axis thereof being identical to said optical axis.

4. An iris apparatus according to claim 3, wherein said rotationally symmetrical surface comprises a spherical surface.

5. An iris apparatus according to claim 1, wherein said transparent plate is movable relative to said transparent elastic member in the direction of the optical axis.

6. An iris apparatus according to claim 1, wherein said light intercepting liquid comprises a colloidal solution which contains therein particles which do not permit light to pass therethrough.

7. An iris apparatus according to claim 1, wherein said actuator comprises a piezoelectric device.

8. An iris apparatus comprising:
   a pair of flat transparent plates opposed to each other with respect to an optical axis and are each provided perpendicular to the optical axis;
   a piezoelectric device provided between said transparent plates at the peripheral portions thereof;
   a transparent elastic member which is attached to an inner surface of one of said transparent plates and which is provided, on the surface thereof opposed to the other said transparent plate, with a convex surface whose apex is located on said optical axis;
   an elastic tube which seals and partly surrounds said transparent elastic member in a space between said transparent plates;
   light intercepting liquid which is contained inside a space defined by said elastic tube; and
   a controller that adjusts the distance between the transparent plates by controlling a voltage to be applied to said piezoelectric device, wherein the amount of deformation of said convex surface of said transparent elastic member by the contact of said other transparent plate is determined by the amount of voltage applied to said piezoelectric device; wherein a portion of said light intercepting liquid within said space can escape from the apex area of said transparent elastic member to a peripheral area of said transparent elastic member upon the deformation of said piezoelectric device.

9. An iris apparatus according to claim 8, wherein said transparent plates are each made of a circular flat glass plate and wherein said transparent elastic member is in the form of a cylinder, the axis thereof being identical to said optical axis; said convex surface being defined by a spherical surface, the center thereof being located on said optical axis.

10. An iris apparatus according to claim 8, wherein one of said pair of flat transparent plates is movable relative to the other of said pair of flat transparent plates in the direction of the optical axis.

11. An iris apparatus according to claim 8, wherein said light intercepting liquid comprises a colloidal solution which contains therein particles which do not permit light to pass therethrough.

12. An iris apparatus according to claim 8, wherein an area defined by said contact of said other transparent plate with said convex surface of said transparent elastic member is a circle.

13. An iris apparatus comprising:
   a transparent elastic member which is provided with a convex surface, the apex thereof being located on an optical axis; said convex surface being rotationally symmetrical, the rotation axis thereof being identical to said optical axis;
   a transparent plate which is opposed to said convex surface of said transparent elastic member in said optical axis direction;
   an elastic container which defines a space between said convex surface of said transparent elastic member and said transparent plate, said elastic container containing light intercepting liquid in said space; and
   an actuator that relatively moves said transparent elastic member and said transparent plate in said optical axis direction, wherein the contact area of said convex surface of said transparent elastic member and said transparent plate is varied; wherein a portion of said light intercepting liquid within said space can escape from the apex area of said transparent elastic member to a peripheral area of said transparent elastic member upon the deformation of said actuator.

14. An iris apparatus according to claim 13, wherein said contact area is a circle.

15. An iris apparatus according to claim 13, wherein said rotationally symmetrical surface comprises a spherical surface.

16. An iris apparatus according to claim 13, wherein said transparent plate is movable relative to said transparent elastic member in the direction of the optical axis.

17. An iris apparatus according to claim 13, wherein said light intercepting liquid comprises a colloidal solution which comprises particles which do not permit light to pass therethrough.

18. An iris apparatus according to claim 13, wherein said actuator comprises a piezoelectric device.

19. An iris apparatus according to claim 13, further comprising a return-spring for returning said transparent plate back to an initial position upon said actuator being released.

* * * * *